Figure 7:
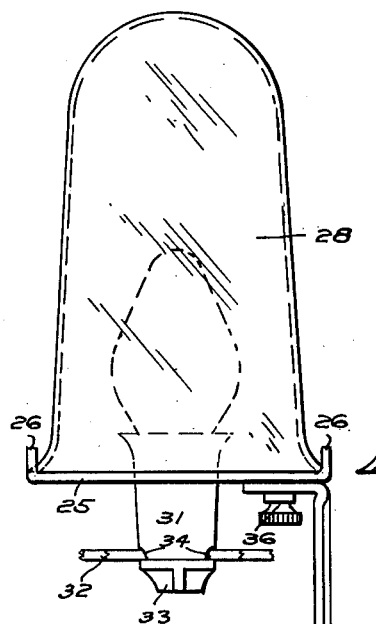

June 25, 1957 W. G. MOORE 2,797,310
ILLUMINATING DEVICE
Filed Oct. 10, 1955 2 Sheets-Sheet 1
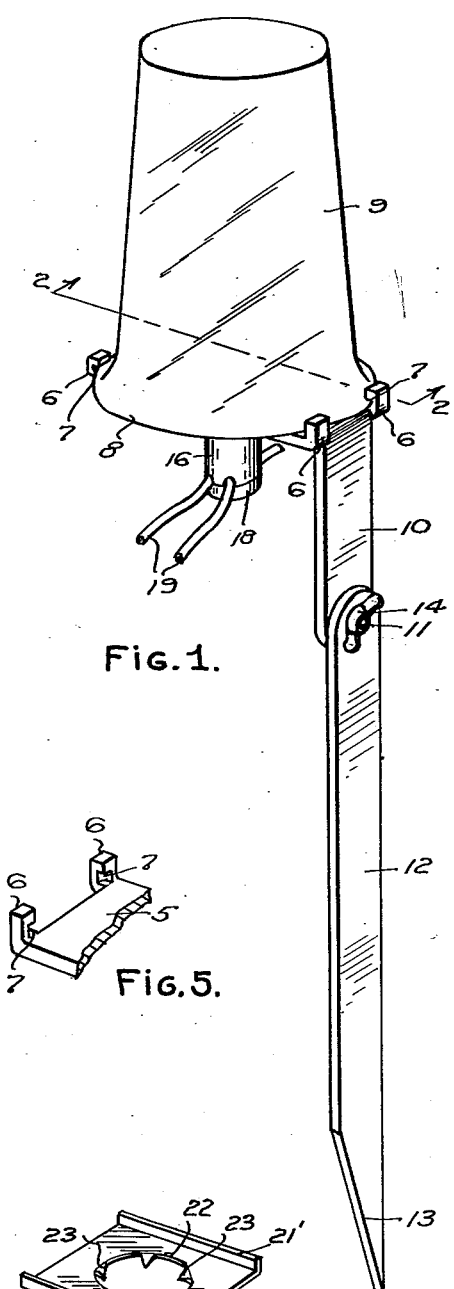
Fig.1.
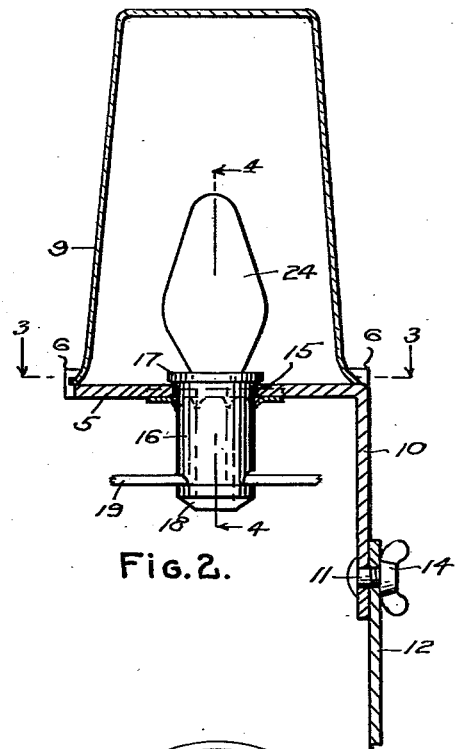
Fig.2.
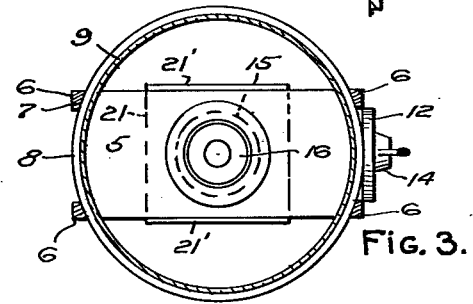
Fig.3.
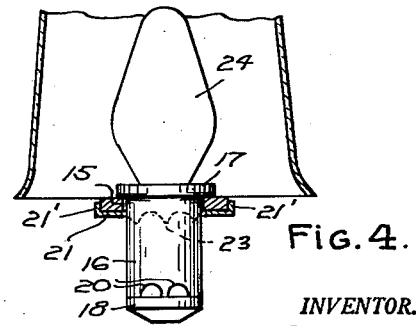
Fig.4.
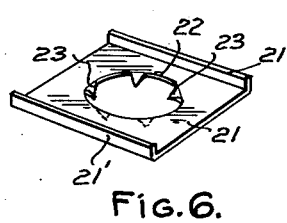
Fig.5.
Fig.6.
INVENTOR.
WALTER G. MOORE,
BY
ATTORNEY.

June 25, 1957 W. G. MOORE 2,797,310
ILLUMINATING DEVICE
Filed Oct. 10, 1955 2 Sheets-Sheet 2

INVENTOR.
WALTER G. MOORE,
BY
ATTORNEY

United States Patent Office 2,797,310
Patented June 25, 1957

2,797,310
ILLUMINATING DEVICE
Walter G. Moore, West Palm Beach, Fla.
Application October 10, 1955, Serial No. 539,313
1 Claim. (Cl. 240—11.2)

This invention relates to a portable illuminating device and has particular reference to a simple and novel form of such device that is designated primarily for use in the illumination of gardens, patios, walkways and other areas and it is contemplated that the device shall be arranged in multiple and with the illuminating means embodying shades of various colors to thereby create various ornamental affects.

The invention contemplates a novel form of bracket that is constructed in a manner to support a lamp socket and a translucent shade and with the socket and the shade being assembled with respect to the bracket in a simple manner.

The invention further contemplates an illuminating device having a source of illumination and a cover shade and with the shade and the source of illumination being assembled in a manner whereby to protect the source of illumination from rain, sprinkler systems or the like.

The invention further contemplates the use of a ground stake that is detachably connected with the supporting bracket and whereby the illuminating device may be disposed throughout various areas of a garden or the like and with the shade creating a soft glow upon surrounding shrubbery, trees or the like and with the stake being bendable to form a wall bracket or a suspending hook whereby the illuminating device may be supported upon a garden wall, or suspended from the limb of a tree.

Various novel features of construction and arrangement of parts will be more clearly apparent during the course of the following description, reference being had to the accompanying drawings, wherein has been illustrated the preferred forms of the device and wherein like characters of reference are employed to denote like parts throughout the several figures.

Figure 8:
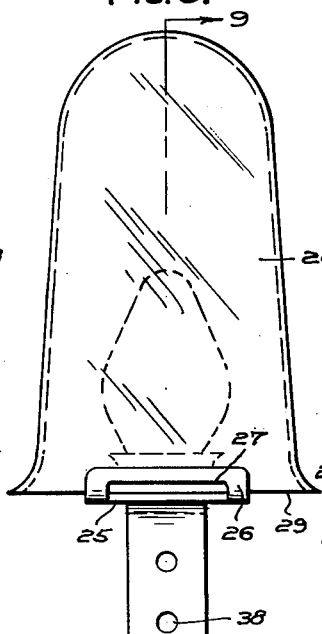
Figure 9:
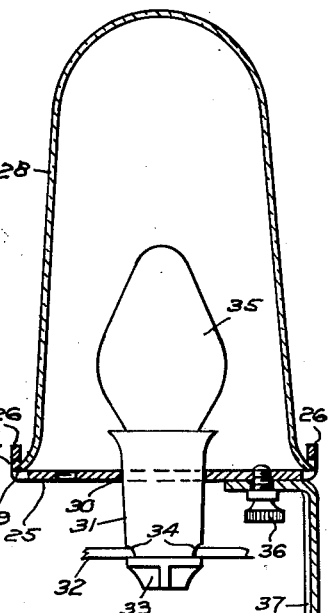
Figure 10:
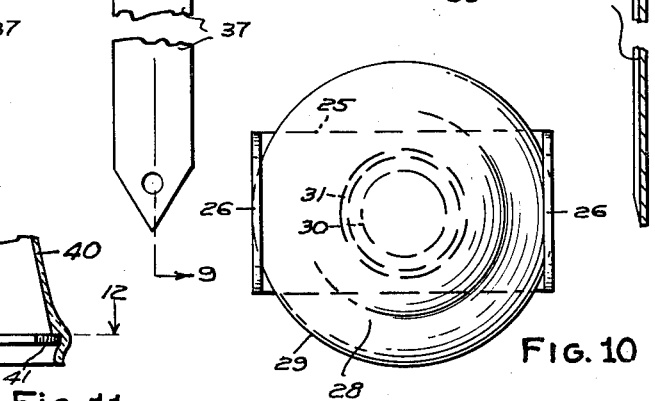
Figure 11:
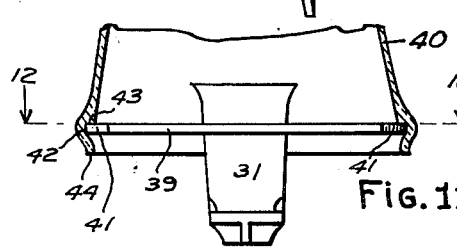
Figure 12:
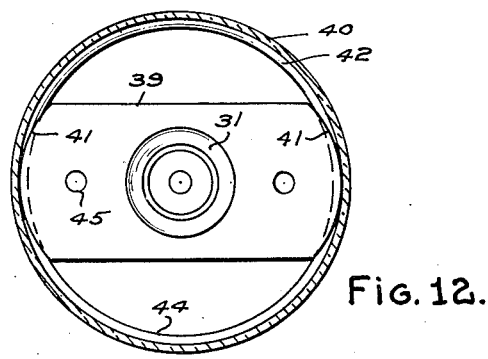

In the drawings:

Figure 1 is a perspective view of an illuminating device constructed in accordance with the invention, Figure 2 is a vertical section taken substantially on line 2—2 of Figure 1, Figure 3 is a horizontal section taken substantially on line 3—3 of Figure 2, Figure 4 is a fragmentary transverse section taken substantially on line 4—4 of Figure 2, Figure 5 is a fragmentary end perspective view of a bracket embodied in the device, Figure 6 is a perspective view of a gripping clip employed to frictionally retain a lamp socket in assembled relation to the bracket, Figure 7 is a side elevation of a modified form of the device, Figure 8 is a side elevation of the device of Figure 7 taken at right angle thereto, Figure 9 is a vertical section taken substantially on line 9—9 of Figure 8, Figure 10 is a plan view of the device of Figure 7, Figure 11 is a fragmentary longitudinal section of a modified form of connection between a supporting bracket and a lamp shade and, Figure 12 is a horizontal section taken substantially on line 12—12 of Figure 11.

The structure embodied in this invention is an improvement over my U. S. Patent No. 2,673,286, issued March 23, 1954.

Referring specifically to the drawings and particularly to Figures 1-6 inclusive, the numeral 5 designates a bracket plate that is rectangular in top plan and with its ends being cut away and bent upwardly to form retaining lugs 6. Each of the lugs are arcuately notched as at 7, for the seating reception of the flanged end 8 of a translucent flexible cover 9. The flange 8 is engaged with the lugs 6 by compressing the opposite sides of the cover 9 whereby the flange is deformed, at which time the flange is engaged upon the surface of the plate 5 and upon release, the marginal edges of the flange engage within the notches 7, to thus securely support the cover with respect to the plate 5. One end of the plate 5 has been bent downwardly at a right angle to form a leg portion 10 that is apertured adjacent its lower end for the passage of a clamping bolt 11 and with the bolt extending through the aperture of a ground stake 12. The stake 12 is beveled or otherwise sharpened at its lower end, as at 13, whereby to facilitate its insertion into the ground. A wing nut 14 serves to tighten the stake with respect to the leg 10 at any desired angularity.

The plate 5 intermediate its ends, has been provided with a cylindrical opening 15, for the passage of a cylindrical lamp socket 16 of conventional construction. The socket at its upper end is provided with a flanged portion 17 that rests upon the upper surface of the plate 5. The socket 16 is of the self-connecting type, well known in the art, and includes the usual lower threaded plug 18, through the medium of which a pair of conductors 19 may be trained through the arcuate openings 20 and with the conductors 19 being pierced and electrically connected to the socket 16 when the plug 18 is turned to seating position. This form of socket has been found most desirable since connections may be quickly and easily established when a plurality of the illuminating devices are arranged in parallel and energized from a single source of electrical energy.

Means are provided to securely retain the socket 16 in seated engagement within the opening 15 and whereby the socket will be held against accidental displacement. Such means comprises a metallic clip 21 having its opposite marginal edges upturned and spaced in a manner to overlie the opposite marginal edges of the plate 5. The clip 21 is preferably of a metal having a certain degree of spring tension. The clip 21 is centrally apertured as at 22 and with the aperture provided with circumferentially spaced and preferably sharpened prongs 23. The points of the prongs 23 define an opening that is smaller than the diameter of the socket 16, while the opening 22 is formed relatively larger in diameter than the diameter of the socket 16. The flanges 21' serve to accurately align the opening 22 with respect to the opening 15 transversely of the plate 5. The assembly of the socket with respect to the plate, consists of first engaging the clip 21 upon the bottom of the plate 5 and with its flanges 21' overlying the edges of the plate. The clip is shifted along the plate 5 until its opening 22 is properly aligned with the opening 15. The socket 16, is then inserted downwardly through the opening 15, engaging the prongs 23 and, by holding the clip firmly against the plate, the socket is forced downwardly, frictionally binding upon the prongs 23 until the flange 17 firmly rests upon the plate 5. In this position the socket is rigidly fixed with respect to the plate 5 against upward shifting movement and the prongs 23 bite upon the surface of the socket to such a degree as permits the operation of the piercing plug 18. It should be understood, that the bracket plate 5, its leg 10, and the ground stake 12 are formed of a metal calculated to resist rusting when exposed to the weather.

In the use of this form of the invention, the several bracket plates 5, the sockets 16 and the clips 21 having been assembled, a lamp 24 is engaged with the socket in the usual manner. It being determined the desired spacing of the several devices to be used in a garden or patio display layout, the pair of conductors 19 are connected with the last device in the group and then progressively trained from one device to the other, in each instance being electrically connected to the respective sockets 16. After the several connections have been made, the free ends of the conductors are provided with a conventional plug-in device whereby to engage a convenient outlet socket. Covers 9 in various colors are selected and quickly and easily clipped in engagement with their respective lugs 6, thus completing the assembly and with the cover determining the particular color scheme, serving to project a soft glow upon surrounding shrubbery or the like, while at the same time adequately protecting the open upper end of the socket 16 against the entry of rain water or water thrown from the sprinkler systems.

In the form of the invention illustrated in Figures 7–9 inclusive, the numeral 25 indicates a generally rectangular bracket plate, corresponding to the plate 5. The opposite end portions of the plate 25 in manufacture, are slotted and bent upwardly at a right angle to form end flanges 26 having slots 27. A translucent cover 28, is provided with a marginal flange 29. The flange 29 is adapted to engage its diametrically opposite areas within the slots 27 when the cover 28 is pressed inwardly upon opposite sides to permit the flange to pass downwardly to a point of contacting engagement upon the top surface of the plate 25 and upon release, the flange 29 engages the slots 27 and securely retains the cover against accidental displacement. The cover 28 may have a flat closed upper end as indicated in Figures 1 and 2, or it may be rounded as indicated in Figures 7–9.

The plate 25 intermediate its ends has been stamped to provide a cylindrical opening 30 for the passage of a conventional tapered lamp socket 31. The socket 31 when forced downwardly through the opening 30, frictionally binds upon the circumferential edge of the opening and most effectively holds the socket against accidental displacement with respect to the plate 25. The socket 31 is of the conventional type that is self-connecting with conductors 32, through the medium of a screw plug 33 and whereby the conductors, usually in pairs may be trained through the notches 34 of the socket to be pierced and electrically connected to the socket when the plug 33 is turned to seating engagement. A conventional lamp 35 is engaged within the upper end of the socket and with the upper end of the socket and the lamp projecting upwardly above the plate 25 to be wholly covered and proctected by the cover 28 against the entry of water into socket.

The plate 25 inwardly of its opposite ends is apertured and threaded for the reception of a clamping screw 36, whereby to securely attach a ground stake 37 as a means to support the illuminating device in an elevated position above the ground. The ground stake 37 is preferably formed arcuate in cross section, to impart rigidity thereto. The ground stake however may be bent to form a suspending hook whereby to suspend the device from the limb of a tree or the stake may be bent to form a wall bracket whereby the device may be mounted upon a wall or other structure. The stake 37 has been apertured at 38 for the passage of fastening screws when the device is bent to form a wall bracket.

In Figures 11 and 12, there has been illustrated a slightly modified form of connecting means between the bracket plate 39 and a translucent cover 40. The plate 39 at its opposite ends is rounded as at 41 upon an arc of less diameter than the diameter of the lower end of the cover 40. The cover 40 inwardly of its lower open end is circumferentially grooved as at 42, forming a shoulder 43 that limits the inward movement of the plate 39 and whereby to define the degree of movement of the cover in assembled relation to the plate 39. From the groove 42, the marginal portion of the cover 40 is slightly inwardly curved at 44, forming in effect a cam surface to facilitate the entry of the rounded ends 41 of the plate 39. In this form of the invention, one end of the plate 39 may be engaged within the slot 42 and, when the cover is pressed inwardly upon opposite sides, the opposite end of the plate will be guided into the slot 42 for abutting engagement with the shoulder 43. The plate 39 in other respects corresponds to the plate 25 of Figure 7 and has been apertured to receive the socket 31 and also apertured at 45 for the reception of the clamping screw 36. This form of connection is self-centering with respect to the cover 40 and definitely disposes the cover in its assembled relation to the plate 39 to effectively protect the socket 31 against foreign elements. In each instance, the upper end of the socket and the lamp are wholly housed within the cover, concentrating the major illumination from the lamp 35 to the cover yet permitting ample ventilation for the lamp between the marginal edges of the plate and the adjacent lower extremity of the cover. The covers in each form of the invention are preferably molded of a suitable material, such as plastic and that will permit the flexing of the lower end of the cover to an extent that permits its engagement with the plates 5, 25 and 39.

It will be apparent from the foregoing that an extremely simple and ornamental device has been provided whereby to illuminate a garden area, patio or the like and permits the assembly of the several units and the connecting of the conductors in a minimum of time and without the necessity of removing the insulation from the conductors in order to establish an electrical connection with the sockets. The ground stakes greatly facilitate the arrangement of the illuminating device in various ornamental arrangements and with the piercing sockets, the spacing of the devices may be quickly and easily accomplished. It is contemplated that the electrical conductors are of the outdoor type, having the usual plastic insulation and, when the conductors are detached from a particular socket and reattached at a different point in spacing, the plastic insulation is self-sealing, thus providing a most effective water-proof combination of illuminating devices. The several parts are cheap to manufacture, are strong, durable, easily assembled or disassembled and facilitate the arrangement of the devices with a minimum of effort.

It is to be understood that the invention is not limited to the precise details of construction, but that changes are contemplated as readily fall within the spirit of the invention as shall be determined by the scope of the claim.

Having described my invention, what I claim as new and desire to secure by Letters Patent is:

In an illuminating device of the character described, a supporting plate member having a substantially rectangular plate portion provided with a central opening for the reception of a lamp socket, said plate portion being provided with upwardly extending lugs at its opposite longitudinal extremities constructed and arranged to form opposite pairs of retaining members, a flexible translucent shade having a flared open lower end retained against longitudinal movement by said lugs; a clip member in the form of a rectangular plate having side flanges frictionally engaging the sides of said first named plate portion for securing said plates in face to face engagement, said clip member having a central opening in registry with said opening in said plate portion, said opening in said clip member having depending circumferential, spaced and sharpened prongs to engage said lamp socket to preclude displacement thereof, said prongs being downwardly and inwardly angled to provide a biting action on said socket.

References Cited in the file of this patent

UNITED STATES PATENTS

| | | |
|---|---|---|
| 1,366,710 | Anker | Jan. 25, 1921 |
| 2,077,107 | Grundman | Apr. 13, 1937 |
| 2,165,835 | Brady et al. | July 11, 1939 |
| 2,317,162 | Wood | Apr. 20, 1943 |
| 2,636,069 | Gilbert | Apr. 21, 1953 |
| 2,673,286 | Moore | Mar. 23, 1954 |